US008380375B2

(12) United States Patent
Tink

(10) Patent No.: US 8,380,375 B2
(45) Date of Patent: Feb. 19, 2013

(54) DEVICE, COMPUTER STORAGE MEDIUM, AND COMPUTER IMPLEMENTED METHOD FOR METROLOGY WITH INERTIAL NAVIGATION SYSTEM AND AIDING

(75) Inventor: Charles William Tink, Houston, TX (US)

(73) Assignee: IPOZ Systems, LLC, Katy, TX (US)

( * ) Notice: Subject to any disclaimer, the term of this patent is extended or adjusted under 35 U.S.C. 154(b) by 295 days.

(21) Appl. No.: 12/856,404

(22) Filed: Aug. 13, 2010

(65) Prior Publication Data

US 2011/0040425 A1 Feb. 17, 2011

Related U.S. Application Data

(60) Provisional application No. 61/234,062, filed on Aug. 14, 2009.

(51) Int. Cl.
*G05D 1/00* (2006.01)
*H04B 11/00* (2006.01)
(52) U.S. Cl. ............................ 701/21; 367/131; 367/134
(58) Field of Classification Search ................ 701/2, 21, 701/400, 408; 367/131, 133, 134; 181/110; 374/136
See application file for complete search history.

(56) References Cited

U.S. PATENT DOCUMENTS

| 4,315,326 | A | * | 2/1982 | Chase, Jr. ...................... 367/134 |
| 2003/0078706 | A1 | * | 4/2003 | Larsen ............................ 701/21 |
| 2003/0093222 | A1 | | 5/2003 | Eiken et al. |
| 2007/0025185 | A1 | * | 2/2007 | Green et al. .................. 367/124 |
| 2007/0106462 | A1 | | 5/2007 | Blain et al. |
| 2009/0238042 | A1 | * | 9/2009 | Hawkinson et al. ............ 367/89 |

OTHER PUBLICATIONS

International Search Report dated Sep. 30, 2010 for PCT/US2010/045621.

* cited by examiner

*Primary Examiner* — Mary Cheung
(74) *Attorney, Agent, or Firm* — Bracewell & Giuliani, LLP

(57) ABSTRACT

A metrology device, computer program product and computer-implemented method generating survey data without having the device touch subsea objects being surveyed. The metrology device may be used with an underwater vehicle or diving personnel, and may comprise an inertial navigation system having gyroscopes to detect angular velocity and accelerometers for the detection of linear velocity and transported by an underwater robotic apparatus or diver, the inertial navigation system outputting position and orientation data of the device for storage; an aiding device for collecting image data of the subsea objects, the aiding device being positioned so that the distance and orientation between the optical scanner and the inertial navigation system is known; and a computer for using the position information and image data between a successively visited known point to determine the drift of the metrology device and to use the drift of the metrology device to correct measurements of same.

15 Claims, 8 Drawing Sheets

DEVICE, COMPUTER STORAGE MEDIUM, AND COMPUTER IMPLEMENTED METHOD FOR METROLOGY WITH INERTIAL NAVIGATION SYSTEM AND AIDING

RELATED APPLICATION

This applications claims the benefit of and priority from U.S. Provisional Patent Application Ser. No. 61/234,062, filed on Aug. 14, 2009, titled "A Device and Method for Touchless Inertial Metrology Using an Inertial Navigation System and Laser," incorporated herein by reference in its entirety.

BACKGROUND OF THE INVENTION

1. Field of the Invention

The invention relates to a method of making measurements on and between existing objects located underwater. More particularly, the invention relates to controlling the drift of an inertial navigation system using a range and bearing image capture system such as a laser camera or similar sensors, to make measurements without the system being in contact with an underwater object or the seabed. The spatial relationship between the inertial navigation system and the underwater object is achieved by range and bearing measurements.

2. Description of the Prior Art

Any motion of an object in space is composed at the microscopic level of two basic motions: micro-rotations and micro-linear motions. An inertial navigation system (hereinafter "INS") measures these motions using gyroscopes (to sense angular motions) and accelerometers (to sense linear motions). The INS may measure rotations using the gyroscope and linear motions using the accelerometers at the high-speed microscopic level (typically 500 times per second). Even given this high sample rate, the INS is subject to error. Because of the imperfection of the accelerometers and gyroscopes, TNS navigation—when not controlled—is subject to a continuous drift that reaches about 0.8 miles per hour in a more accurate INS and several miles per hour in one that is less accurate.

This drift is especially problematic when the INS is used in underwater metrology i.e., the science of measuring accurately the position and orientation of objects and physical structures underwater (often on the seabed). The most common metrology consists in measuring the distance between the two flanges of a pipeline system that will receive the ends of a jumper or spool i.e. the hard, prefabricated connecting pipes that join a pipeline system (typically ending at a manifold) and a wellhead. The accurate measurement of distance between receptacles of the pipeline and the wellhead, to which each end of the jumper is to be attached, is crucial to ensure accurate manufacturing of the jumper. To that end, the exact distance between the pipeline receptacle and the wellhead receptacle, the difference in depth between them and the exact 3D orientation (heading, pitch and roll) of each receptacle must be accurately measured.

To correct for drift in underwater metrology, the INS navigation is sometimes corrected using an "aiding by zero velocity update", or zupt method. The zupt is a period without motion where the INS is parked on some structure on the seabed: usually either one of the 2 receptacles that need to be measured. When the INS is parked for at least 15 seconds, the INS recalibrates and corrects any navigation drift from the knowledge that when there is no motion the readings of the accelerometers and gyroscopes must be caused by noise (pure erroneous measurements). The draw back of such a method is that it requires that the INS carried by a robot (such as a Remotely Operated Vehicle or "ROV") or other vehicles or a diver, touches the flange or receptacle (actually: the INS rests on the receptacle for at least 15 seconds), potentially causing damage. Even worse, in order to measure accurately the position and orientation of those flanges, a mating system (stabbing guide) is often specially made and installed on or near the two flanges to perform these traditional metrologies which is cumbersome.

Accordingly, embodiments of the present method and device, control the drift of an INS used in underwater inertial metrology without touching any seabed structure, and therefore without the requirement for stabbing guides. Thereby the invention allows for "touchless" metrology.

SUMMARY OF THE INVENTION

A metrology device for use with an underwater vehicle or diving personnel is described herein, wherein the metrology device may comprise an inertial navigation system having gyroscopes to detect angular velocity and accelerometers for the detection of linear velocity and transported by an underwater robotic apparatus or diver, the inertial navigation system outputting position and orientation data for storage; an aiding device comprising a laser—or similar source—positioned in a relationship with an optical scanner so that when a light is emitted from the laser, the scanner is in a position to determine a characteristic of a reflective light from the laser for the purpose of measuring distance and orientation to points of reflection, the aiding device being positioned so that the distance and orientation between the optical scanner and the inertial navigation system is known, and the aiding device outputting laser data or similar ranging and or orientation information for storage; a controller having a microprocessor a timing device and memory, said controller receiving and storing the position and orientation data from the INS and the ranging and orientation data from the laser or similar aiding device together with time tag data indicating when the data was output from the inertial navigation system before storage and when the data was output from the aiding device, before storage; and an interface for connecting to a remote control center, the interface outputting the INS data and the aiding device data from the memory when such output is requested by the remote control center either in near real time, or after the survey. The remote control center processes all data to determine the drift of the inertial navigation system, and therefore allows for precise and accurate navigation measurements. Moreover, the devices allows the INS to locate precisely the objects or structures located on the seabed and therefore measure precisely their position and orientation as well as distances and depth differences between the objects and structures without the need to park the inertial navigation system on any structure underwater.

Another embodiment of the metrology device has an inertial navigation system (INS) in a fixed manner with a laser camera or similar device that will remotely measure range and bearing to fixed objects located away from the INS, in order to compute the exact position of these objects first with an error caused by the drift of the INS navigation in real-time, and then the exact position of these objects without error, after the navigation has been corrected. The laser camera or similar device may be made to capture three-dimensional pictures of particular objects on the seabed, while the INS will compute positions associated with these images. And, all data may be time stamped and recorded. The recorded data may be downloaded at the end of the survey and processed, so that the positions of the images captured will be computed and the difference of position between 2 images of the same object will be used to compute the drift of the INS navigation, which caused the positions of a same fixed object to be different. The difference in position may be used to recompute the remaining position information of the data objects in the survey with great accuracy and therefore compute precisely the distance between objects which images have been captured as well as other measurements of use in the offshore oil industry.

In another embodiment of the invention, a computer-implemented method using an INS with a laser camera or similar device to use the images captured by that device as well as the positions associated to these images by the INS, and store all these data, for later processing is disclosed. The method of understanding that the different positions computed by an INS and associated for a same object owe their differences to the drift of the INS, and therefore that the method of matching the images to transform 2 images into 1 image of a single object will deliver the information of the distance between the 2 original images which should have been 0 if there was no drift. The method of applying that computation of the difference between the 2 images to correct the navigation of the INS, until—once reprocessed—the position of the 2 images are now equal and the 2 images superimpose into one single image. The method of applying this knowledge of the drift of the INS navigation, to the whole navigation and therefore to post process all positions and orientations information for the whole survey and obtain a very accurate result in navigation. The method of using this new and accurate navigation to compute the exact distance between objects on the seabed which has value in the industry for the measurement of jumpers or pieces of pipeline that will be placed between objects on the seabed, which is called metrology.

The software or computer process that is involved in every step of the present invention include: the process of associating an INS with a laser camera in a fixed manner in space, by recording and storing their lever arms in each dimension (X, Y, Z) as well as their angular difference in the three dimensions (heading, pitch and roll), so that the positions and orientations computed by an INS are mathematically associated with the positions and orientations of the camera or similar device so that every pixel or cloud point, has in turn a position in three dimension which will allow to re-build by software the whole object in three dimension; the routine of starting and navigating the INS and the laser camera or similar device within the rules of the art of navigation, and time stamping and recording all necessary data which includes INS and camera data; the routine of collecting, time stamping and recording a 3 dimensional image or point cloud of each object of interest on the seabed, as well as the INS navigation information simultaneously; the routine of outputting all the time stamped data to an external computer or memory device at the end of the survey for further processing while checking the integrity of communications. All data is then processed to 1) identify single objects, out of point clouds, 2) associate positions with each object, 3) recognize a given object in different images, when a given object has been captured several times, 4) compute the difference in position associated with that single object on different occasions, and therefore 5) compute the drift of the INS navigation between capture of different images of a same object, 6) apply that drift to correct the INS navigation and make it more accurate, and finally 7) use this more accurate INS navigation solution to output all the deliverables requested by the client of a metrology survey, which includes the distance between several objects, and thus the necessary length of a pipeline jumper that will join these objects as well as differences in depth and orientations of each objects.

In each of the embodiments, the survey is to be conducted without touching any of the underwater structures being measured.

BRIEF DESCRIPTION OF THE DRAWINGS

Some of the features and benefits of the present invention having been stated, others will become apparent as the description proceeds when taken in conjunction with the accompanying drawings, in which.

While the invention will be described in connection with the preferred embodiments, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION

The present invention will now be described more fully hereinafter with reference to the accompanying drawings in which embodiments of the invention are shown. This invention may, however, be embodied in many different forms and should not be construed as limited to the illustrated embodiments set forth herein; rather, these embodiments are provided so that this disclosure will be thorough and complete, and will fully convey the scope of the invention to those skilled in the art. Like numbers refer to like elements throughout.

An INS is used in underwater metrology to measure the distance between two underwater features, such as jumper receptacles. An INS uses gyroscopes and accelerometers to measure micro-linear and micro-rotational movements to orient the body of a device and track device location. These readings can then be used to measure the distance between the two receptacles. Because this reading is disposed to error in the form of drift, embodiments of the present invention use a laser scanner or other types of laser cameras or similar sensors to correct the error. Such a device and method of operation of same has the benefit of being "touchless", i.e., the INS does not have to be parked on a structure and therefore does not need mating guides on the structures to correct any of its own navigation drifts.

Figure 1:
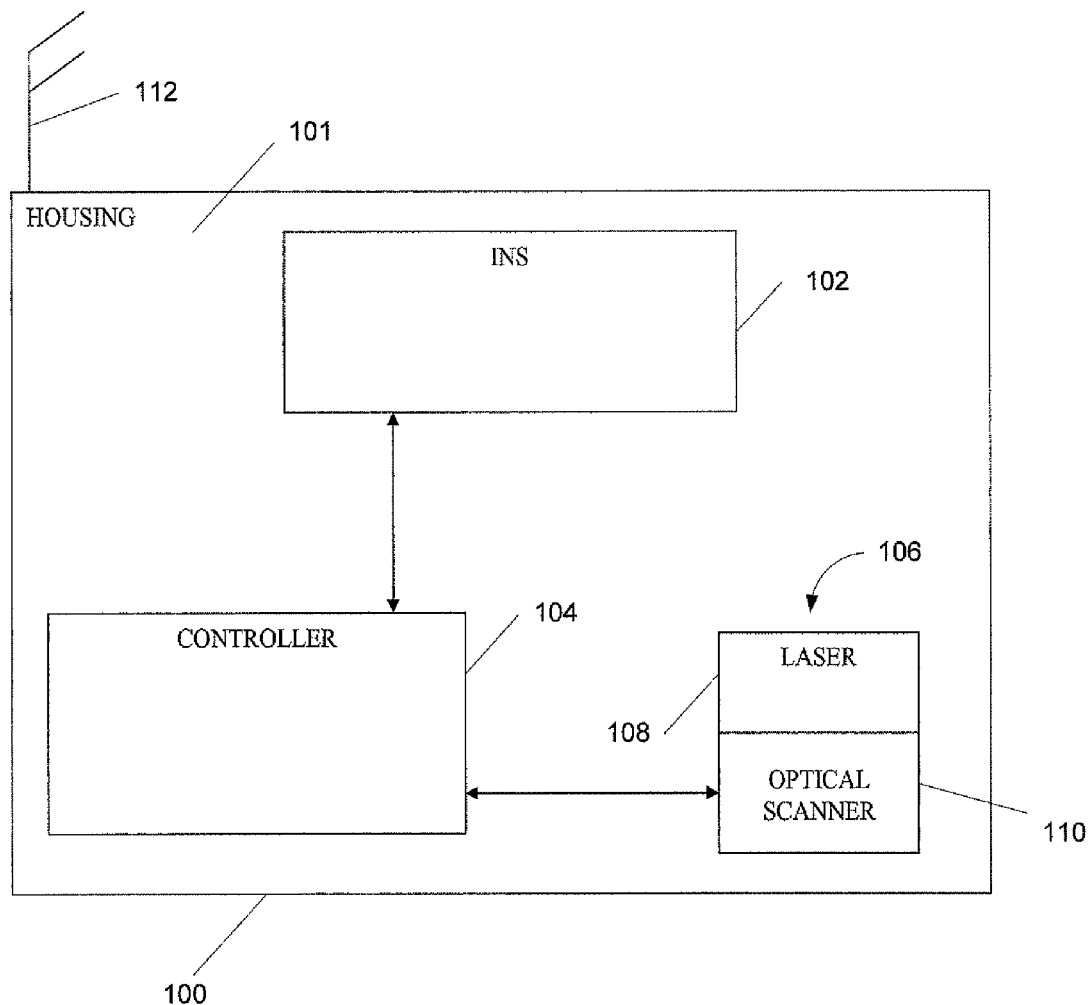
FIG. 1 is a block diagram of a device and system for providing touchless inertial metrology according to an embodiment of the present invention.

A metrology device 100 used for measuring the position and orientation of underwater objects according to an embodiment of the invention is shown in reference to FIG. 1. Typically, metrology device 100 is an independent tool, transported and operated by an underwater robotic vehicle or a diver to aid in data collection, though the metrology device may also be connected to buoys or other flotation devices, underwater submarines, and like vehicles or tools. Metrology device 100 includes a housing 101, an INS 102, a controller 104, an aiding device 106, using, for example, a laser 108 and an optical scanner 110, and communications network interface 112. Laser 108 and optical scanner 110 might also be a laser camera such as "flash laser cameras" or any similar sensor that will deliver distances. The metrology device 100 may be connected to an ROV or control center using the communications network interface 112, e.g. a transceiver (not shown), modem, or the like.

INS 102 provides measurements as to the location and orientation of various objects and is comprised of, for example, three gyroscopes and three accelerometers located on three perpendicular axes (not shown). Examples of INS systems that may be used in the system include T24 manufactured by Kearfott, or PHINS manufactured by Ixsea or other INS. The INS 102 provides full 3-dimensional position and orientation data by measuring rotations and linear motions, at a very high speed, for example, 500 HZ, then integrating the data to generate the position. The INS 102 is connected to and controlled by controller 104.

Aiding device 106 is also connected to controller 104. Aiding device 106 comprises and imaging device, including, for example, laser 108 and optical scanner 110. Laser 106 can be any laser suitable for use in gathering of image data, for example, a semi-conductor based laser, and optical scanner 110 may be a camera, lens and/or optical deflector, etc. As one skilled in the art will appreciate, aiding device 106 may also be a flash laser camera or other similar device. If aiding device 106 is embodied as a laser 108 and optical scanner 110, aiding device 106 may use either a "time of flight" technique or a "triangulation" method to extrapolate 3-D "pictures" of an object. As one skilled in the art will appreciate, if the aiding device 106 uses a triangulation technique, aiding device 106 will employ a laser 108 and an optical scanner 110 having for example a camera and lens. In such a device, a light emitted from laser 108 in either a dot or stripe is reflected back through a lens to a camera. The position of the reflected light in the camera is used to obtain data about the object. If aiding device 106 uses a time of flight technique, aiding device 106 uses laser 108 and an optical scanner 110 in the form of a sensor to capture the reflection of light from laser 108. The time it takes for light to make a round trip from the laser to the deflector is used to calculate the distance between metrology device 100 and the object. If aiding device 106 is a flash laser camera, all orientations and ranges are collected simultaneously (in one flash). For either technique, thousands of data points are collected, and these points are used to form the 3D "picture" of the object referred to hereafter.

Though shown having an antenna, metrology device 100 and various computer components associated with a control center may be connected together using a variety of communications network interfaces 112. As one skilled in the art will appreciate, the communications network interface 112 can connect the metrology device 110 to external components using a transceiver, modem, I/O, etc., and the communications network may be a wireless network, local area network ("LAN") or wide area network ("WAN"), or a combination thereof. For example, the metrology device 100 may be connected to a control center using a transceiver, modem, or other data connection port via optical fiber or a wireless network, and the control center may be privately networked (LAN) set of computer components to allow for faster data processing, or metrology device 100 may be in direct communication with a remote operated vehicle ("ROV") controller using, e.g., I/O ports, with the ROV connected to a surface control station using optical fiber or a wireless communications network. In yet another configuration, metrology device 100 may store all collected data, and connect via a surface or rig located I/O interface to a computer network that uses e.g., a WAN and LAN to connect to a control station for data processing. Accordingly, though not all such configurations are depicted, all are within the scope of the disclosure.

Figure 2:
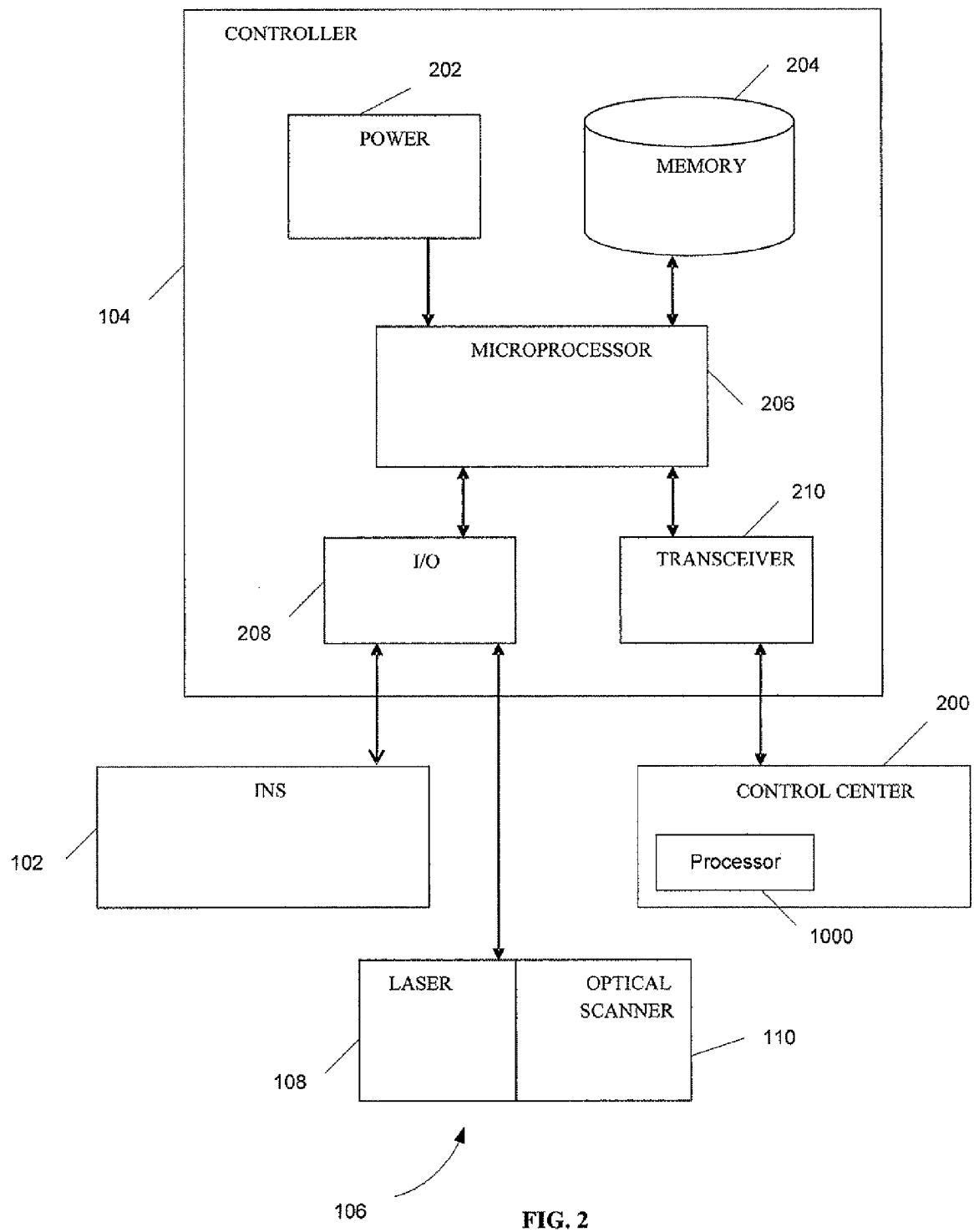
FIG. 2 is a block diagram of a controller used in a device or system to provide touchless inertial metrology according to an embodiment of the present invention.
Figure 4:
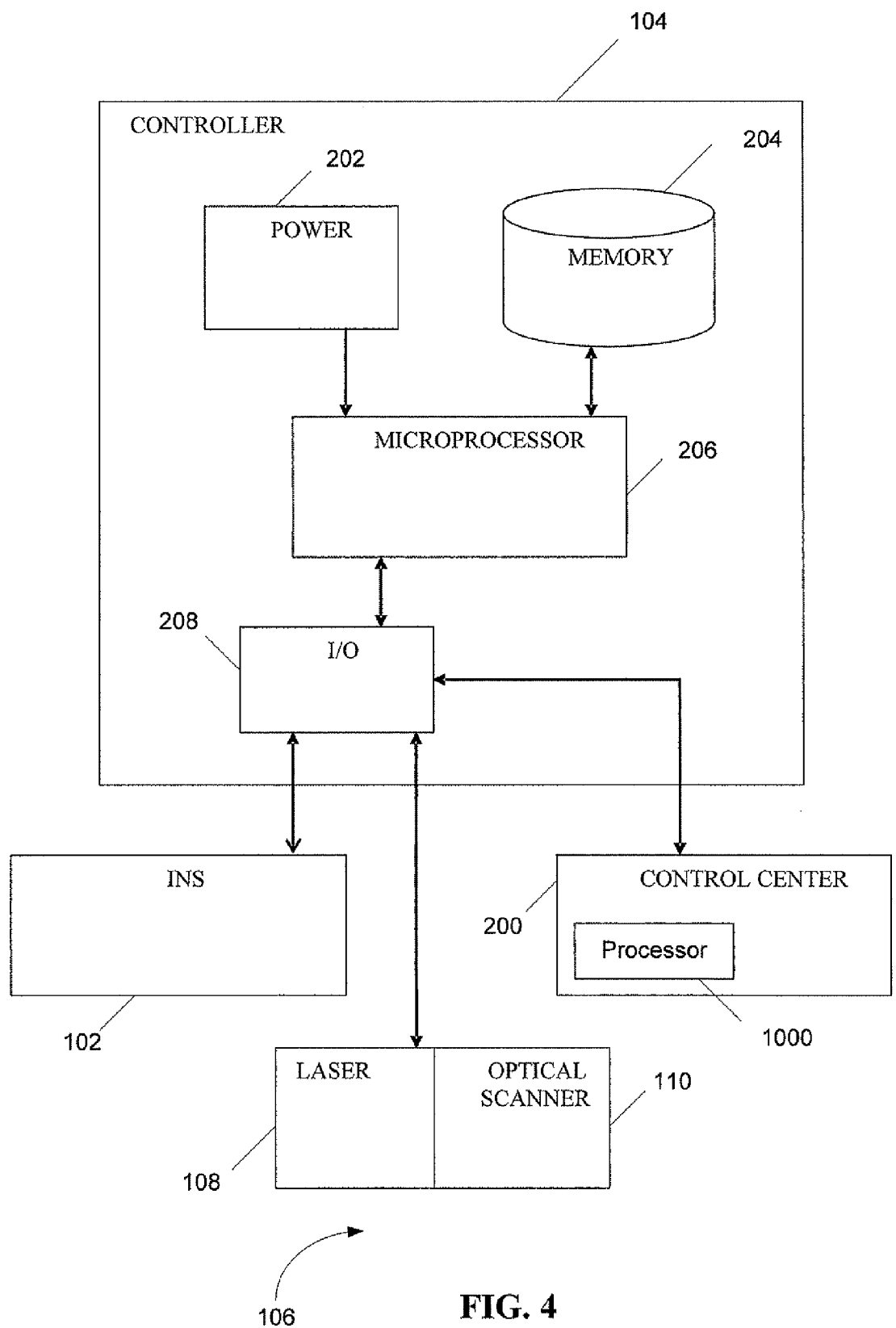
FIG. 4. is a block diagram of a controller used in a device or system to provide touchless inertial metrology according to an embodiment of the present invention without transceiver.

As previously mentioned, controller 104 is the "brains" of device 100, and is connected to both the INS 102 and aiding device 106 to enable the time tagging, calculation and processing of measurement readings, as well as to control functionality of same. Controller 104 is described in detail in FIG. 2. In general, controller 104 comprises a power supply 202, a memory (or data storage) 204, a microprocessor 206, an input/output ("I/O") device 208 and a transceiver 210. Alternatively, as shown in FIG. 4, a transceiver may not be employed for remotely connecting the metrology device 100 to a control center. Instead, in the embodiment of FIG. 4, a control center 200 is directly connected to I/O device 208. The control center 200 may, for example, be part of the control electronics of the ROV. Still in alternative embodiments, control center 200 might be the remote control station or other intermediary data collection point (such as computers located on an offshore rig), and as such, data would be stored in memory 204 and uploaded to the control center once the ROV surfaces or transmitted using the ROV communication connection to the remote control station. Accordingly, all of these embodiments are within the scope of this disclosure.

Returning to FIG. 2, power supply 202 supplies and regulates power to the various components of microprocessor 206, and would be composed of power electronics with voltage transformation and regulation, plus typically a battery, and one of its connectors would be typically connected by cable to a robot or like vehicle carrying metrology device 100. The battery would maintain functionality of the whole system if the power is interrupted or corrupted, or not connected to the vehicle. Power supply 202 is connected to microprocessor 206, which will be described in detail below. Memory 204 is also connected to microprocessor 206 and stores measurement and program data for use by microprocessor 206. As such, memory 204 may consists of both non-volatile memory, e.g., hard disks, flash memory, optical disks, and the like, and volatile memory, e.g., SRAM, DRAM, SDRAM, etc., as required to process embodiments of the instant invention. As one skilled in the art will appreciate, though memory 204 is depicted on, e.g., the motherboard, of the controller 104, memory 204 may also be a separate component or device, e.g., FLASH memory, connected to the controller 104.

I/O 208 and optionally, e.g., a transceiver 210, may provide the communications network interfaces 112 for controller 104 (not including any external power source for power supply 202). I/O 208 is a standard computing interface and may be any I/O devices including, but not limited to a network card/controller connected by a PCI bus to the motherboard, or hardware built into the motherboard to connect microprocessor 206 and memory 204. Optional transceiver 210 if used is connected to the microprocessor and allows metrology device 100 to communicate with a remote control center 200 for the purposes of data collection and determining measurement locations, in case this data collection is done remotely. As one skilled in the art will appreciate, transceiver 210 is any device capable of sending a receiving data signals at a particular frequency, and includes all filters, modulators, demodulators and other devices required to achieve this end Microprocessor 206 performs the basic computer operations of controller 104. This includes, but is not limited to, all of the program functions, control of all periphery devices including INS 102 and aiding device 106, read/write operations, clock functions, etc. As one skilled in the art will appreciate, microprocessor 206 may be any processor capable of handling the data collection requirements of the metrology device 100. For example, a 64 bit processor like AMD 64, INTEL 64, or e.g., Intel® Xeon® multicore processors, Intel® micro-architecture Nehalem, AMD Opteron" multicore processors, etc., depending upon the number and complexity of measurements and number of laser points scanned by aiding device 108 could be used.

Figure 3:
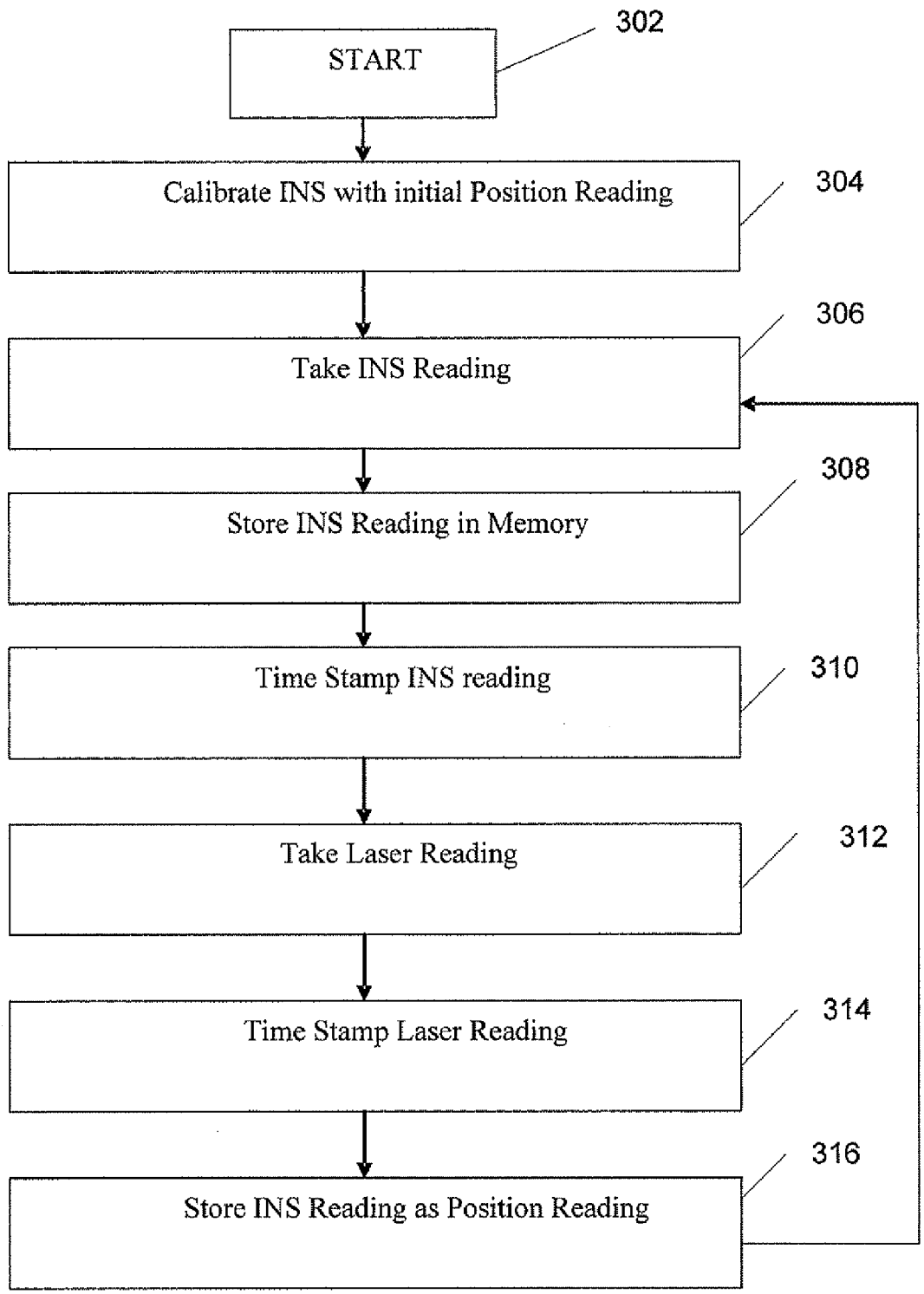
FIG. 3 is a flow diagram of the operation of instructions executable on a microprocessor of FIG. 2 according to an embodiment of the invention.

Microprocessor 206 executes instructions stored in memory 204 to perform the inventive data collection functions. A general flow chart depicting instructions executed by microprocessor 206 for recording data at each of the subsea objects is shown in FIG. 3. As shown, when the metrology device 100 is mounted and initially calibrated, and the data collection process starts, and all of the sensors are powered on (step 302). When INS 102 is powered on, microprocessor 206 uses information about the position of metrology device 100 to align INS 102 (step 304). To align, the INS 102 automatically measures all forces using its gyroscopes and accelerometers e.g., the earth's rotation and gravity, to precisely locate the North direction and the vertical vector. This orientation is called alignment (or calibration). After a short period of alignment (20 minutes or so), the INS begins navigating, meaning it continuously computes and outputs its position and orientation, even when it is being moved (step 306). The INS reading is time stamped (step 308), and stored in memory (step 310). Microprocessor 206 takes a measurement reading using image data from aiding device 106 (step 312), time stamps the measurement reading, and stores it in memory (step 314). The INS reading is stored as a position reading and a new INS reading is taken (step 316). At this point, the position reading and image data may be continuously transmitted to a control center using e.g., the transceiver, modem, etc; but may be also stored in memory as a back up or to be uploaded to the control center 200 at a later time. Moreover, it is possible that the INS readings are time stamped and recorded virtually simultaneously with the measurement readings from the aiding device. In this way, data processing requirements including data rates of microprocessor 206 can be controlled.

Figure 5:
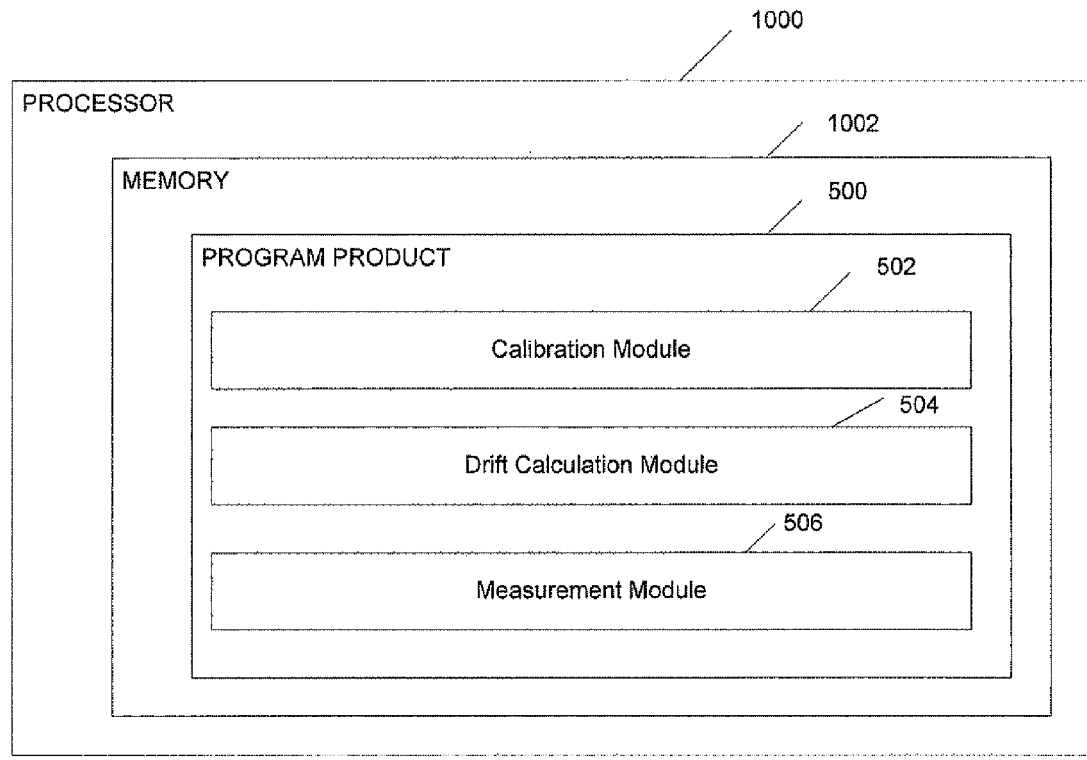
FIG. 5. is a block diagram of a processor having a memory and a program product disposed therein for providing control signals to a touchless inertial metrology device and system according to an embodiment of the invention.

Returning to FIG. 2 and FIG. 4, the data collected by the metrology device 100 is collected and transmitted to the control center 200 for processing using the methods described herein. As one skilled in the art will appreciate, the control center 200 may also control the metrology device and ROV. As such, the control center may be located at the surface and connected to the metrology device and ROV via transceiver, modem, or the like over e.g., optical fiber; or alternatively may be devices located on the ROV. To perform the functions thereof, the control center 200 defines a computer having a processor 1000 and a memory 1002 (FIG. 5). Though depicted as separate from the metrology device controller, as one skilled in the art will appreciate, there are some configurations where the metrology device controller 104 and control center 200 are the same device or computer.

Though not depicted, an I/O device, transceiver, modem, etc., may provide a communications interface between the control center 200 and metrology device 100. In some configurations, an I/O device would be a standard computing interface and may be any I/O devices including, but not limited to a network card/controller connected by a PCI bus to the motherboard, or hardware built into the motherboard to connect processor 1000 and memory 1002 to the metrology device 100. Optionally, a modem or transceiver can be used to connect the processor to the metrology device 100 and allows metrology device to communicate with a remote control center 200 for the purposes of data collection and determining measurement locations, in embodiments where data collection is done remotely. As one skilled in the art will appreciate, such a transceiver or modem may be any device capable of sending a receiving data signals at a particular frequency, and includes all filters, modulators, demodulators and other devices required to achieve this end Processor 1000 performs the basic computer operations of control center 200. This includes, but is not limited to, all of the program functions, including high-level control of the ROV, metrology device, or other components of the system. As one skilled in the art will appreciate, processor 1000 may be any processor capable of handling the data processing requirements for the metrology device 100. For example, an Intel® Xeon® multicore processors, Intel® micro-architecture Nehalem, AMD Opteron" multicore processors, etc., or simpler processor could be used depending upon the number and complexity of measurements and number of laser points scanned by aiding device 108.

As one skilled in the art will appreciate, memory 1002 may consists of both non-volatile memory, e.g., hard disks, flash memory, optical disks, and the like, and volatile memory, e.g., SRAM, DRAM, SDRAM, etc., as required to process embodiments of the instant invention. As one skilled in the art will appreciate, though memory 1000 is depicted on, e.g., the motherboard, of the control center 200, memory 1002 may also be a separate component or device, e.g., FLASH memory, connected to the control center 200. Importantly, memory 1002 stores program product 500 thereon to perform several of the control function of the instant invention.

As shown in FIG. 5, memory 1002 includes program product 500 having several program modules disposed thereon including a calibration module 502, a drift calculation module 504 and a post-processing module 506, to perform many of the control functions of the instant invention. As one skilled in the art will appreciate, each of these programming modules comprise sets of instructions that enable the metrology device to produce accurate measurement data of the field using image data and INS data. As one skilled in the art will appreciate, each of the calibration module 502, drift calculation module 504 and post-processing module 506 may include various other modules and sub-modules to perform the operation thereof, and accordingly the description of these modules are by way of example and are not intended to limit the disclosure to the three modules described herein. Moreover, though some of the modules may be described as initiating other modules, this is not necessary and each module may operate as independent processes. For example, the drift calculation module may be executed on one date and the post-processing module executed at another date. In addition, the various modules may be initiated at any time to check data, i.e., drift calculations, etc.

Figure 6:
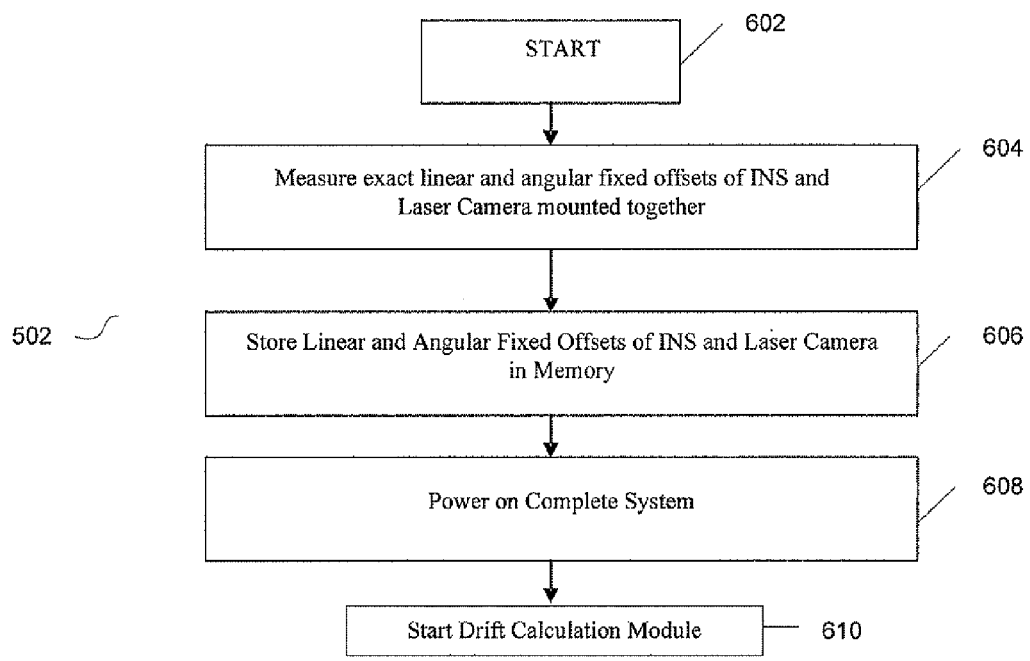
FIG. 6. is a software flow diagram for a calibration module shown in FIG. 5 according to an embodiment of the invention.

Calibration module 502 is run upon the initial calibration of the metrology device and power on operations, and as such includes instructions to perform these functions as shown in FIG. 6. The calibration module 502 is initiated at the time of powering of the INS but does not need the rest of the metrology device 100 to be powered on. In such instances the INS 102 and aiding device 106 are mounted in the device in a known configuration so that the linear and angular offsets may be calculated (step 604). To do this, complete 3D lever arms and boresight angles between the INS and the aiding device 106 are fixed by measuring and storing the lever arms in each dimension (X, Y, Z) as well as each angular difference in the three dimensions (heading, pitch and roll), so that the positions and orientations computed by an INS are mathematically associated with the positions and orientations of the camera or similar device. The calculated linear and angular offsets are stored in the control center 200 memory to be used by the other modules (step 606). Finally, the complete metrology device 100 may be powered on (step 608), and the drift calculation module 504 called.

Figure 7:
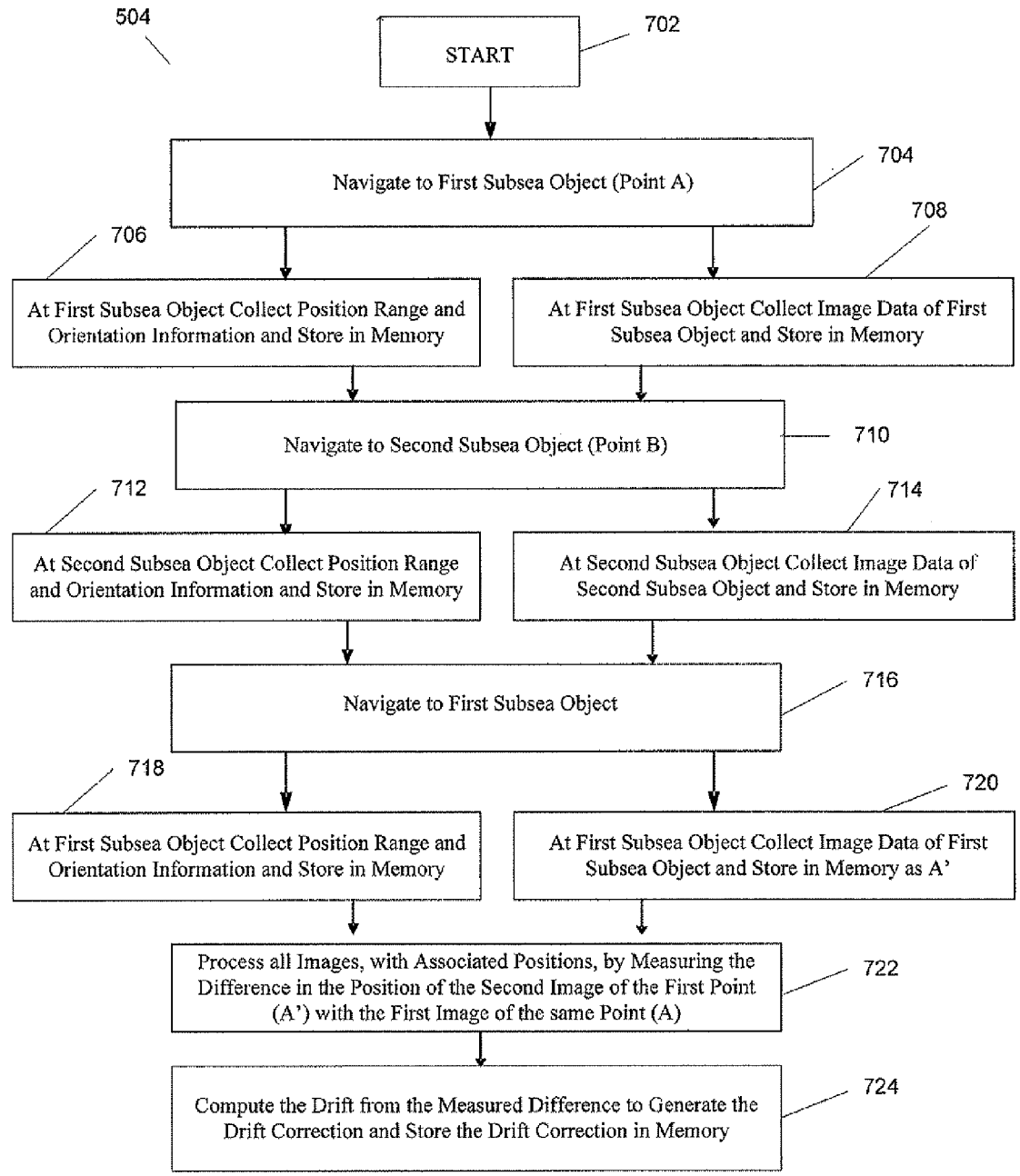
FIG. 7 is a software flow diagram for a drift calculation module shown in FIG. 5 according to an embodiment of the invention.
Figure 9:
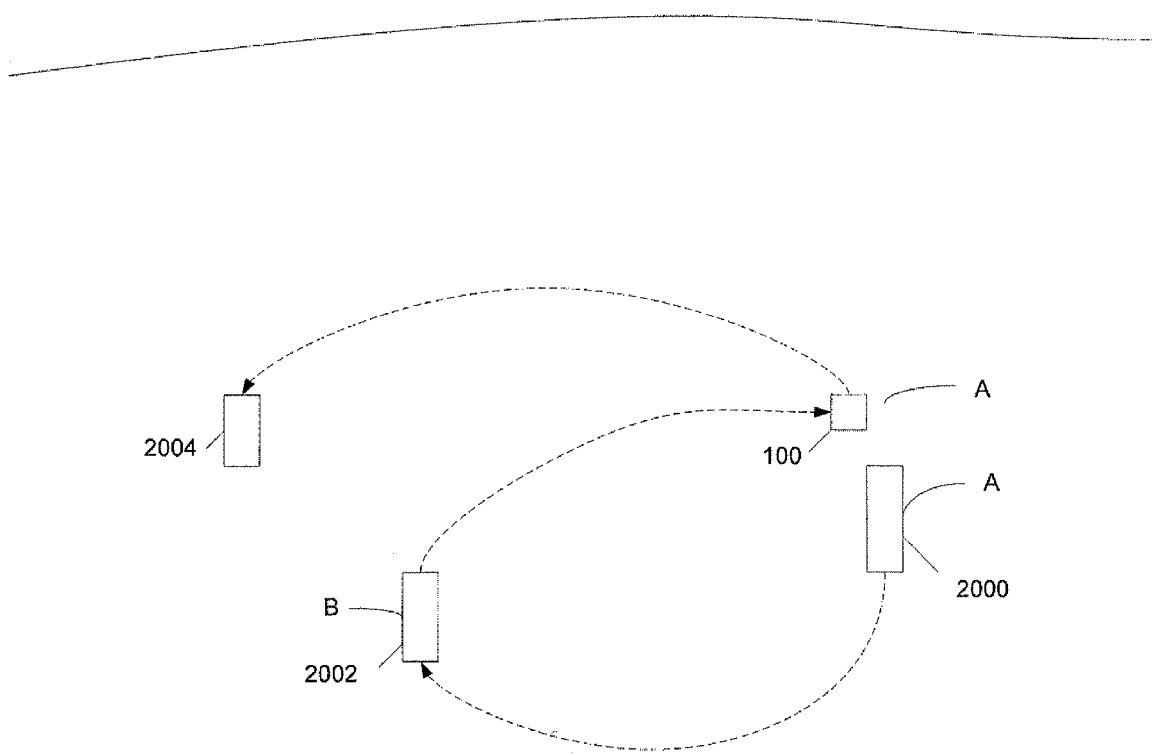
FIG. 9 is a diagram of the metrology device in operation surveying a plurality of subsea structures according to an embodiment of the invention.

Drift calculation module 504 is run to calculate the drift of the metrology device 100 for a particular data field of objects, and is run upon the initiation of the metrology device 100 for such field as shown in FIGS. 7 and 9. The drift calculation module is initiated (step 702) and the vehicle carrying the metrology device 100 is instructed to navigate to the first subsea object 2000, point A (step 704). Simultaneously, the first subsea object data is collected, including position, range and orientation data, and stored in memory (step 706); and image data is captured of the first subsea object 2000 and stored in memory (step 708). Then, the metrology device 100 is navigated to a second object subsea 2002 object, point B (step 710). Simultaneously, the second subsea object data is collected, including position, range and orientation data, and stored in memory (step 712); and image data is captured of the second subsea object and stored in memory (step 714). The metrology device 100 is then navigated back to the first subsea object 2000 (step 716), but its navigated position is displaced from point A due to the drift of the metrology device, so the displaced position of the metrology device is defined as point A'. Simultaneously, the first subsea object data for point A' is collected, including position, range and orientation data, and stored in memory (step 718); and image data of point A' is captured of the first subsea object and stored in memory (step 720). After data is collected for points A, A' and B, the images are processed along with associated positions of the metrology device at each of the points, and the difference in position between points A and A' are measured (step 722). Finally, the drift is computed from the measured difference (step 724), and the drift is stored in memory.

Figure 8:
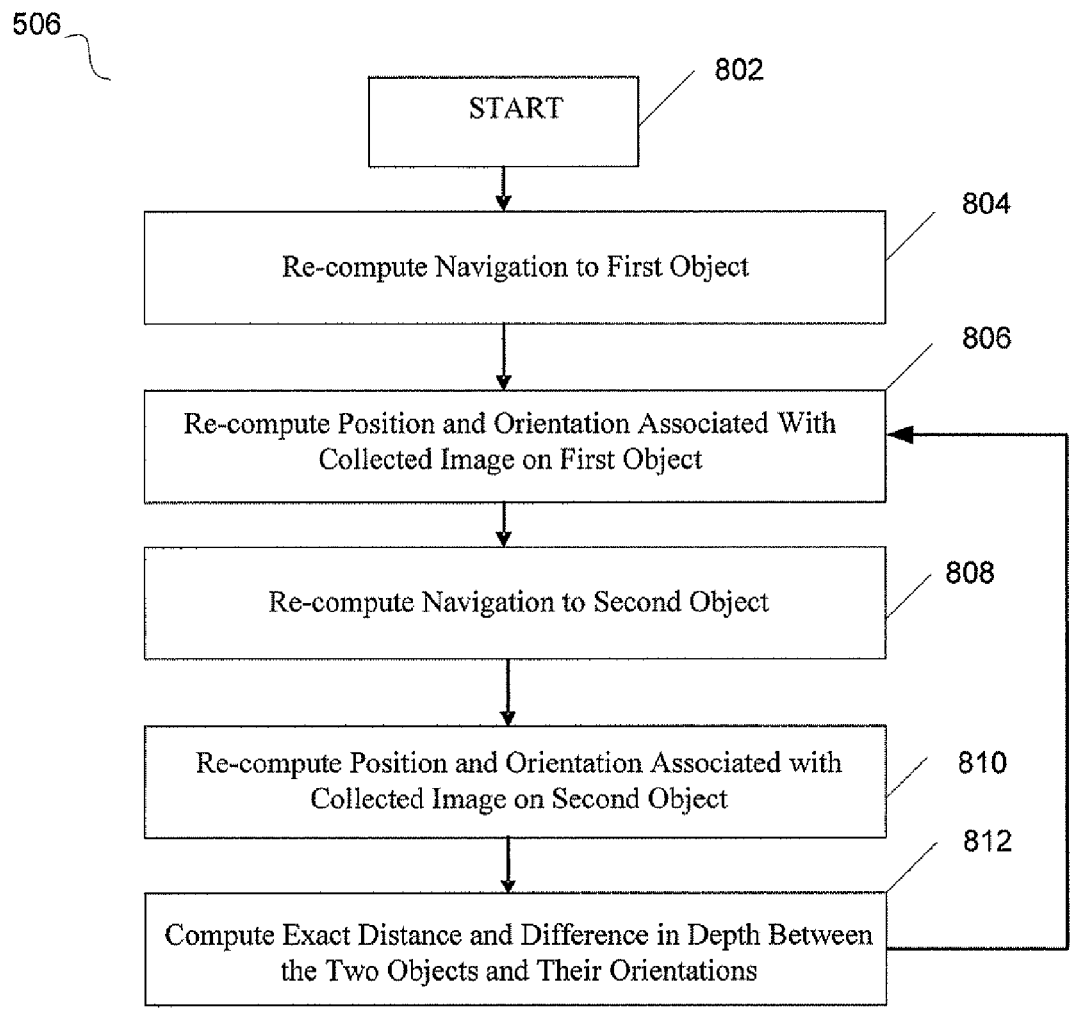
FIG. 8 is a software flow diagram for a post-processing module shown in FIG. 5 according to an embodiment of the invention.

Post-processing module 506 is run to perform correct measurements of distances between objects by correcting for any drift in the metrology device 100. This module is run after the drift calculation module to complete object measurements as shown in FIG. 8 and FIG. 9. The post-processing module 506 is initiated in step 802. Once the post-processing module is initiated, the navigation of metrology device 100 from the start of navigation to the first subsea object 2000 (step 804) is re-computed. Position, range, orientation collected for point 2000 are re-computed (step 806) and stored in memory. Using the drift calculation generated by the drift calculation module 504, the precise measurement of the position, range, orientation collected for the second subsea object 2002 is calculated (step 808) and stored in memory (step 810). Finally, the distance, difference in depths between the 2 objects and their orientations are computed (step 812). As one skilled in the art will appreciate a particular section of survey is calculated with the same drift, but drift is recomputed for different sections of survey. Accordingly, metrology device 100 may gather additional data for a drift calculation between the first subsea object 2000 and target 2004. In such instances, the post-processing module would proceed to calculate the drift and then correct the drift between the first object 2000 and target 2004 immediately after computing the drift and correcting the measurements between the first subsea object 2000 and second subsea object 2002.

In use, the metrology device of the current invention can be attached or transported by an underwater robotic vessel commonly used in offshore oil drilling, e.g. an AUV or ROV, but also may be transported by divers or other vehicle. The ROV may be equipped with Sonar, TV camera's, lights, manipulators, etc. and the metrology device of the embodiments of this invention. The ROV optionally provides electrical and communications interfacing for metrology device 100. As one skilled in the art will appreciate, the ROV has horizontal thrusters, vertical thrusters and lateral thrusters to allow for ROV maneuverability in all axes. The ROV also has robotic arms that can be used if needed to extend the device 100 over the receptacles or other objects to be scanned by the laser.

Metrology device 100 is mounted so that INS 102 is "fixed" to aiding device 106, i.e., complete 3D lever arms and boresight angles between the INS and the aiding device 106 are fixed, perfectly measured, and known. The submarine ROV or other vehicle or diver carries the metrology device 100 from one receptacle to the other, aiding device 106 scans all surfaces located under the receptacle, while the INS 102 continuously records the 3D position and orientation of the laser source. All data is precisely time tagged. When "flying" over each receptacle the INS 102 and aiding device 106 collect a cloud of laser points corresponding to the image of the receptacle, each point having a 3D position computed by the system. Other objects, structures, and areas of the seafloor can be scanned in the process, as extra information to be collected for the client. The system will continuously fly back and forth between the 2 receptacles, collecting data for each receptacle, e.g., several iterations might be necessary. At the end, the recorded data of all types is transmitted to a control center using, e.g., transceiver 210 and/or a communications link on ROV.

Once the data has been recorded it can be processed at the control center on the surface vessel or onshore (depending how close to real time the results are needed), so that an image of each receptacle will be reconstituted. Successive images of each receptacle will be joined (superimposed—i.e. "collocated") either manually or electronically so that the known relatively fixed locations of the receptacles or other reference points can be computed to anchor the position of the INS. Once these fixed relative locations are determined, drift can be calculated using the time stamped INS data, because the drift is the difference in location between two images of the same object. Once the drift is precisely computed (the distance between the 2 images of the same object is known) it can be removed from the INS navigation solution, giving in result an accurate navigation solution, and an accurately located survey and laser images of all the structures surveyed. In this way the inertial navigation drift has been corrected by the use of a scanning laser or similar device to update regularly its position, without touching any hard structure at the bottom: hence the name of "touchless" inertial metrology. As one skilled in the art will also appreciate, after the initial calculation of the drift, survey data from the data field can be gathered, and any error in the position readings caused by the drift removed, without returning to the known position of the initial structure. Accordingly, the invention may save time and survey expense.

As one skilled in the art will appreciate, the functions of all components of the exemplary embodiments of the invention may execute within the same hardware as the other components comprising, or each component may operate in a separate hardware element. For example, the data processing, data acquisition/logging, and data control functions of the present invention can be achieved via separate components or all combined within the same component.

Moreover, the drawings and specification have disclosed typical embodiments of the invention, and although some specific terms are employed, the terms are used in a descriptive sense only and not for the purposes of limitation. The invention has been described in considerable detail with specific reference to these illustrated embodiments. It will be apparent, however, that various modifications and changes can be made within the spirit and scope of the invention as described in the foregoing specification and as defined in the attached claims

What is claimed is:

1. A metrology device comprising:
    an inertial navigation system (INS) having one or more gyroscopes to detect angular velocity and one or more accelerometers to detect linear velocity and adapted to be transported by an underwater robotic apparatus or diver, and outputting position and orientation data;
    an aiding device to record image data, and being configured to output distance and orientation data between the aiding device and the INS;
    a controller having one or more processors and non-transitory memory, the controller receiving and storing in the non-transitory memory the position and orientation data from the INS and the distance and orientation data from the aiding device together with time tag data indicating when the data was output from the INS before storage and when the data was output from the aiding device before storage;
    an interface to connect to a control center, the interface outputting the INS data and the aiding device data from the non-transitory memory when such output is requested by the control center either in near real time or after a survey;
    a computer defining a control center computer, the control center computer having a processor and non-transitory memory, the memory having computer readable instructions stored therein that when executed cause the control center to execute the instructions of:
    measuring, responsive to collecting first subsea object data from the controller, the first subsea data including data from the INS and aiding device including first object position, range and orientation data and image data; second subsea object data from the controller, the second subsea data including data from the INS and aiding device including second object position, range and orientation data and image data; and navigated first subsea object data from the controller, the navigated first subsea object data including data from the INS and aiding device including navigated first object position, range and orientation data and image data, a difference in the 3D position of the navigated first object position and the first object position;
    calculating a drift correction for the INS responsive to a difference between the first subsea object position and the navigated first subsea object position;
    measuring a target position responsive to collecting target object data from the controller, the target object data including data from the INS and aiding device including target position, range and orientation data, image data, and a distance between the target position and the first object position to generate a measured position of the target; and
    correcting the measured position of the target responsive to calculated drift.

2. A metrology device of claim 1, wherein the aiding device comprises a laser camera, and wherein the laser camera comprised one or more flash laser cameras.

3. A metrology device of claim 1, wherein the aiding device comprises a laser positioned in a relationship with an optical scanner so that when a light is emitted from the laser, the scanner is in a position to determine a characteristic of a reflective light from the laser to measure distance and orientation to points of reflection.

4. A metrology device of claim 1, wherein the metrology device is integrated into a remote operated vehicle (ROV), and the control center computer further performs the operation of:
    navigating the ROV to the first subsea object, second subsea object and target.

5. A metrology device of claim 1, wherein the control center computer further performs the operation of:
    calibrating the aiding device by measuring the exact linear and angular fixed offsets of the INS and aiding device.

6. Non-transitory, tangible computer storage medium having computer product operable on a computer defining a control center computer, the control center computer having one or more processors and non-transitory control memory, the computer program performing a process of determining a drift of a metrology device used in surveying a plurality of subsea objects and a process of correcting a measured position of the plurality of subsea objects using the drift, the computer program comprising a set of instructions for performing the steps of:
    measuring, responsive to collecting a first subsea object data from a metrology device controller, the first subsea data including data from an inertial navigation system (INS) and an aiding device including first object position, range and orientation data and image data; a second subsea object data from the metrology device controller, the second subsea data including data from the INS and aiding device including second object position, range and orientation data and image data; and a navigated first subsea object data from the metrology device controller, the navigated first subsea object data including data from the INS and aiding device including navigated first object position, range and orientation data and image data, a difference in the 3D position of the navigated first object position and the first object position;
    calculating a drift correction for the INS using the difference between the first subsea object position and the navigated first subsea object position;
    measuring a target position responsive to collecting a target object data from the controller, the target object data including data from the INS and aiding device including target position, range and orientation data, image data, and a distance between the target position and the first object position to generate a measured position of the target; and
    correcting the measured position of the target using the calculated drift.

7. A computer program product of claim 6, wherein the aiding device comprises one or more flash laser cameras.

8. A computer program product of claim 6, wherein the aiding device comprises a laser positioned in a relationship with an optical scanner so that when a light is emitted from the laser, the scanner is in a position to determine a characteristic of a reflective light from the laser to measure distance and orientation to points of reflection.

9. A computer program product of claim 6, wherein the metrology device is integrated into a remote operated vehicle (ROV), and the computer program performs the operation of:
   navigating the ROV to the first subsea object, second subsea object and target.

10. A computer program product of claim 6, wherein the computer program product further performs the operation of:
   calibrating the aiding device by measuring the exact linear and angular fixed offsets of the INS and aiding device.

11. A computer-implemented method for performing a process of determining a drift of a metrology device used in surveying a plurality of subsea objects and a process of correcting a measured position of the plurality of subsea objects using the drift, the computer implemented method comprising:
   measuring, responsive to collecting a first subsea object data from a metrology device controller, the first subsea object data including data from an inertial navigation system (INS) and an aiding device including first object position, range and orientation data and image data; a second subsea object data from the metrology device controller, the second subsea data including data from the INS and aiding device including second object position, range and orientation data and image data; and a navigated first subsea object data from the metrology device controller, the navigated first subsea object data including data from the INS and aiding device including navigated first object position, range and orientation data and image data, a difference in the 3D position of the navigated first object position and the first object position;
   calculating a drift correction for the INS using the difference between the first subsea object position and the navigated first subsea object position;
   measuring a target position responsive to collecting a target object data from the controller, the target data including data from the INS and aiding device including target position, range and orientation data, image data, and a distance between the target position and the first object position to generate a measured position of the target; and
   correcting the measured position of the target using the calculated drift 12. A computer-implemented method of claim 11, wherein the aiding device comprises one or more flash laser cameras.

13. A computer-implemented method of claim 11, wherein the aiding device comprises a laser positioned in a relationship with an optical scanner so that when a light is emitted from the laser, the scanner is in a position to determine a characteristic of a reflective light from the laser to measure distance and orientation to points of reflection.

14. A computer-implemented method of claim 11, wherein the metrology device is integrated into a remote operated vehicle (ROV), and the computer-implemented method performs the operation of:
   navigating the ROV to the first subsea object, second subsea object and target.

15. A computer-implemented method of claim 11, wherein the computer-implemented method further performs the operation of:
   calibrating the aiding device by measuring the exact linear and angular fixed offsets of the INS and aiding device.

* * * * *